Jan. 28, 1969 M. R. EUVERARD 3,423,837
DRY COATING THICKNESS GAGE
Filed May 23, 1966
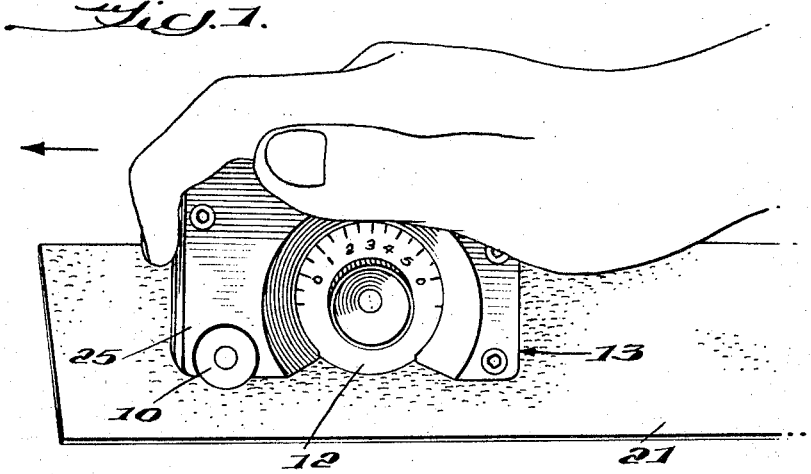
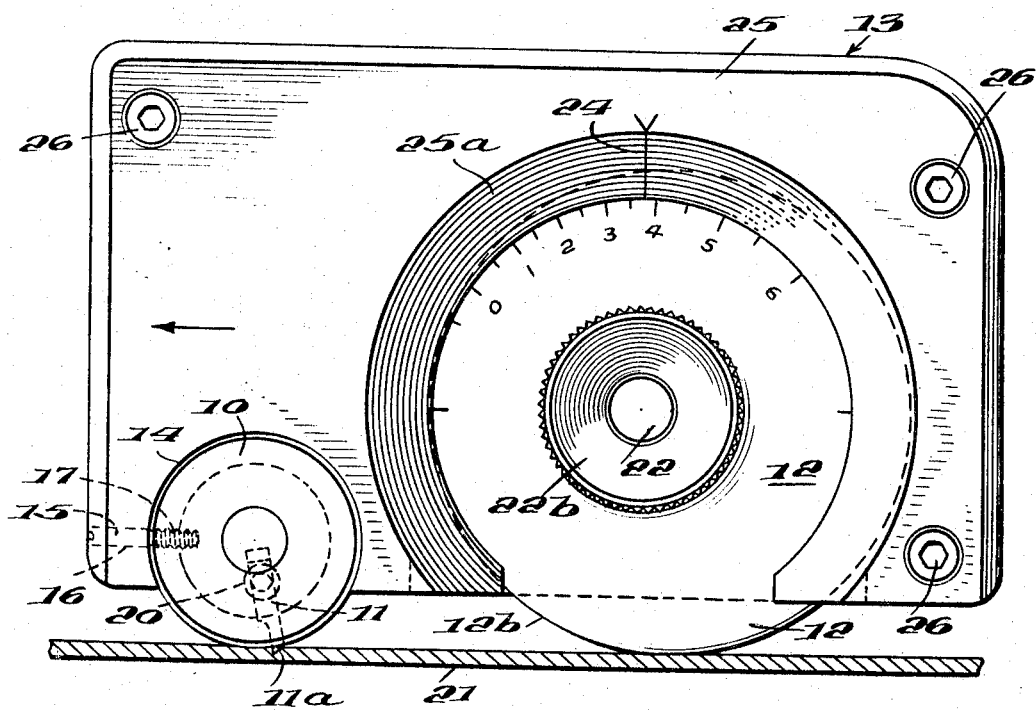

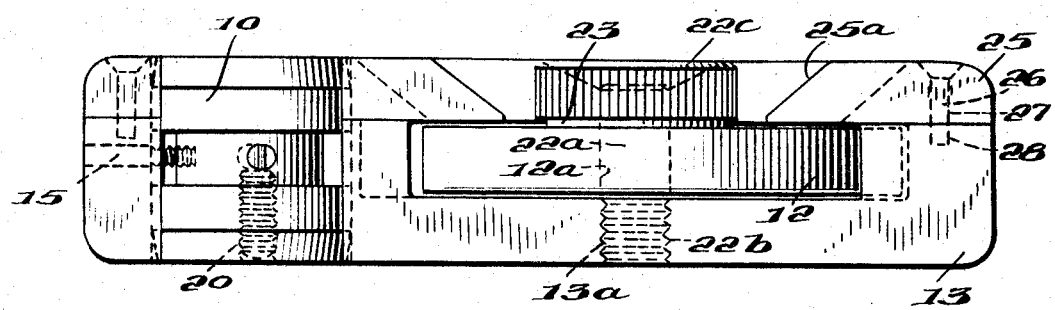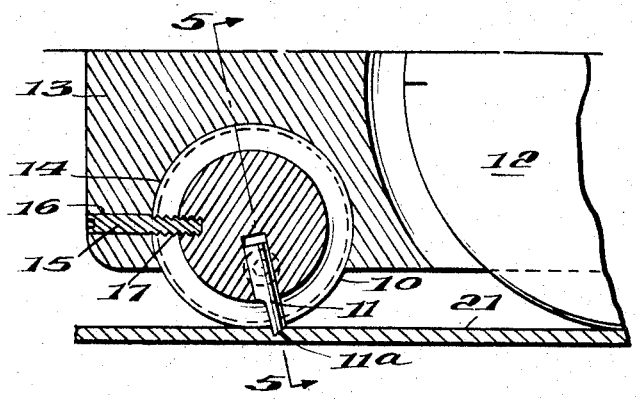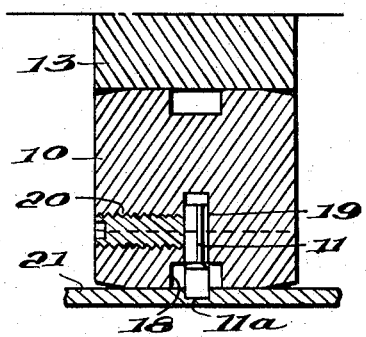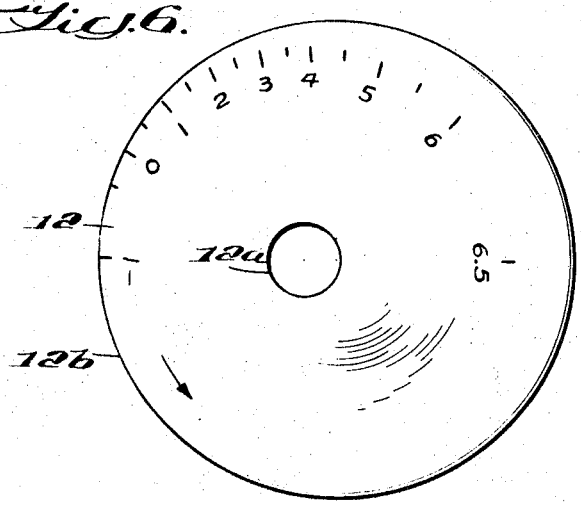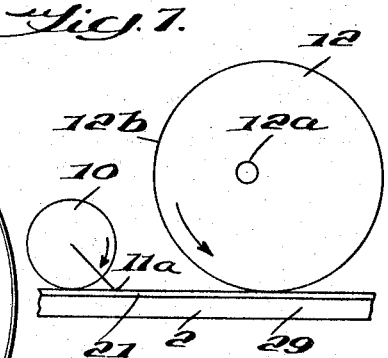
INVENTOR
MAYNARD R. EUVERARD,
BY Pierce Scheffler & Parker
ATTORNEYS

# United States Patent Office 3,423,837
Patented Jan. 28, 1969

3,423,837
DRY COATING THICKNESS GAGE
Maynard R. Euverard, 305 Desota Drive,
Richmond, Va. 23229
Filed May 23, 1966, 552,293
U.S. Cl. 33—169
Int. Cl. G01b 3/28, 5/06
6 Claims

ABSTRACT OF THE DISCLOSURE

Between spaced supports designed to be slid over the surface of a solid flat coating is fixed a cutter adapted to penetrate the coating as a gauge of coating thickness. The protrusion of the cutter below the plane of the supporting surface is established by the setting of one of the supports, which is formed as an eccentric cam rotatable about a supporting and clamping bolt and provided with a peripheral scale calibrated in amount of cutter protrusion.

---

The present invention relates to an improved gage structure for measuring the thickness of dried coatings applied to any base such as dried coatings of paints, lacquers, varnishes, and the like. Coatings applied to any base material such as wood, plastic, glass or metal can be meaured provided the surface is sufficiently rigid or can be supported so as not to be deformed by the pressure required when taking a measurement.

The gage has the additional advantage of being portable since it is of comparatively small size and weight and is adapted to be held by hand when making a measurement. The gage can be used in any position, is easy to use and is comparatively simple in construction and has no moving parts when in use. The gage also has the advantage in that its readings are not adversely affected by non-uniform base characteristics and, since the top surface of the coating is the reference surface when taking a measurement one thereby eliminates errors which otherwise accrue when using gages of other types which involve measurement also of the thickness of the base to which the coating is applied. Furthermore, when multiple coats of differently colored materials have been applied to a base surface, it is possible to determine the thickness of each coat.

The gage in accordance with the invention operates on the so-called "scratch" principle since the gaging is accomplished by means of a cutter which scratches through the coating to a preselected depth determined by the gage setting. To that extent the present gage is similar to the gage construction as described in my previously granted United States Patent No. 2,814,122. However, the present construction is an improvement over that construction since it is more stable in operation and provides infinitely variable adjustment within the limits of the gage of the movement of the fixed cutter in relation to the base plane. as a function of a change in setting of a cam which controls the depth of penetration of the cutter into the coating.

As compared with the gage construction disclosed in my previously mentioned patent which utilizes but a single support element for the cutter slidable over the surface of the coating, the gage in accordance with the present invention utilizes two spaced supports which are adapted to be slid along the surface of the coating, the cutter element being located intermediate the supports and the depth of penetration of the cutter into the coating being determined by adjusting the effective height of the rear support in relation to the cutting point. This adjustment is effected by means of an adjustable cam surface which forms one support and the cutter penetration depth is read off on a scale carried by the cam.

The improved gage can be used for a "Go No-go" type of measurement for determining whether or not a minimum specified coating thickness has been applied to a base surface. For such applications, the cutter is set to a penetration depth corresponding to the minimum coating thickness and the gage can be considered to be nondestructive of all coatings which meet the prescribed minimum thickness test since, in such case, the cutter will not cut entirely through the coating and exposed the base surface. The gage can also be used to measure the actual thickness of any coating in which case the procedure is to set the gage to a penetration depth known to be less than the total thickness of the coating and then make a series of scratches each of increasing depth until the last one made just barely exposes the surface of the base.

Contact of the cutter with the base surface can be determined visually or, if the base be electrically conductive, an electrical circuit can be set up between the cutter and base to determine contact therebetween, this circuit being closed through an indicating instrument and resistor as soon as contact takes place.

The foregoing as well as other objects and advantages inherent in the invention will become more apparent from the following description of a preferred embodiment thereof as illustrated in the accompanying drawings wherein:

FIG. 1 is a view in perspective of the improved dry film thickness gage and also showing the manner in which it is held by the user to measure thickness of a coating;

FIG. 2 is a view of the gage in side elevation;

FIG. 3 is a bottom plan view of the gage;

FIG. 4 is a partial vertical section of the gage illustrating structural and mounting details of the cutter;

FIG. 5 is a section on line 5—5 of FIG. 4;

FIG. 6 is a face view of the adjustable rear support in the form of a cam by which the cutter is set to different depths of penetration of the coating being measured; and FIG. 7 is a somewhat diagrammatic view of the gage which has been included to facilitate an understanding of the principle upon which the gage operates.

With reference now to the drawings, the improved gage is seen to be comprised principally of a front, or leading support for the cutter element in the form of a cylindrical body 10 preferably made from stainless steel to establish a good, corrosion-free wear resistance, the cutter element 11 being mounted in the cylindrical body 10 and being directed in a generally downward direction, a rear support 12 in the form of an adjustable cam, this cam also preferably being made from stainless steel, and a frame 13 in which the cylindrical body 10 and its cutter, and cam 12 are mounted. Frame 13 is preferably made from aluminum in order to lessen the overall weight of the gage but may be made from other metals, if so desired.

The forward part of frame 13 is provided with a transversely extending arcuate bore 14 having a diameter substantially the same as the diameter of the cylindrical body 10 so as to receive the latter in a snug, sliding fit. To maintain the body 10 in place within the frame and to prevent it from rotating about its axis, it will be seen that a set screw 15 is adapted to enter a bore 16 located in the front portion of frame 13 and be screwed into a threaded bore 17 in the body 10. The body 10 is also provided with a centrally located peripheral groove 18 and a radial bore 19 extending inwardly from the base of this groove for receiving the shank portion of the cutter 11 which is preferably made from high-speed tool steel so as not to be damaged by contact with hard base surfaces. The shank of cutter 11 is retained in bore 19 by means of a set screw 20 threaded into the body 10 from one end face thereof. As seen in FIG. 4, cutter 11 extends generally downward so that the lower cutting edge 11a thereof will penetrate the coating 21, at least the partial thickness of which is to be measured.

Cam 12 which establishes the rear slidable support for the gage is actually a cylindrical body of comparatively short axial length in comparison to its diameter, the latter being considerably larger than the front cylindrical support body 10 to establish a large mechanical amplification for a given change in cutter penetration depth. The necessary cam action required of this rear support is established by mounting the cylinder 12 in an eccentric manner, there being provided for this purpose a combined mounting and locking stud bolt 22. The shank portion 22a of this bolt has a diameter substantially the same size as an eccentrically located hole 12a provided in cylinder 12 to establish both a support for the cylinder and an axis about which the cylinder can be rotationally adjusted. The threaded end 22b of this bolt is screwed into a threaded bore 13a in frame 13, and the bolt head 22c which is grooved or otherwise roughened such as by knurling for easier manipulation by the fingers, is adapted to apply pressure against the adjacent face of cylinder 12 by way of an intermediately positioned washer 23 when the bolt is screwed down, and hence, lock the cylinder 12 against eccentric rotational displacement about the bolt axis. To adjust the cylinder 12 rotationally, the bolt 22 is simply unscrewed until the side pressure on the cylinder is relieved.

As shown in FIG. 6, the side face of the cam cylinder 12 is provided with an arcuate scale graduated in half-mil steps from —1 mil to 6.5 mils. The graduation marks on this scale, in the form of short lines are coordinated to a stationary reference mark in the form of a line 24 inscribed on a beveled face portion 25a of a side plate 25 for frame 13. Side plate 25 is secured in place on the frame by a plurality of Allen screws 26, the heads of which are recessed within countersinks of bores 27 through the plate 25, and these screws thread into correspondingly aligned threaded bores 28 in the side of frame 13. The reference line 24 extends to the inner edge of the beveled face 25a which overlies a portion of the graduation marks of the scale so that any of these marks can be brought into registration with the reference mark 24 as cam cylinder 12 is rotationally adjusted about an axis which is eccentric to the center of this cylinder.

The principle of operation for this gage is believed to be self-evident by reference to FIG. 7. In this view, only the front and rear supports 10 and 12 with the cutter 11 located therebetween have been depicted, and the adjustment of the rear support, i.e. cam cylinder 12 is such that the upper surface of coating 21 on base 29 constitutes a plane tangent to cylinders 10 and 12 at their respective contact lines with coating 21, this plane being barely touched also by the lower, cutting edge 11a of cutter 11. This constitutes the zero setting for the gage and hence, the scale mark "0" would then be in alignment with reference mark 24. As cam cylinder 12 is rotationally adjusted in a counterclockwise direction, the distance from cam surface 12b at the line of contact with the surface of coating 21 to the eccentrically located axis of rotation will progressively lessen and the distance between contact on coating 21 of the front and rear supports 10 and 12 changes which has in combination the effect of rotating the cutter 11 in a clockwise direction about the center of the front cylindrical support 10 so that its lower cutting edge 11a will drop below the surface of coating 21. Consequently, when cam cylinder 12 is set to any position above "0," and the gage is slid by hand along the coating as depicted in FIG. 1, the cutting edge 11a of the cutter member which extends beyond the periphery of cylinder 10 will penetrate and remove the coating to be measured to the particular depth to which the gage is set. In the position depicted in FIGS. 1 and 2, the protruding cutter edge 11a will penetrate and remove the coating 21 to a depth of about 3.75 mils. The width of the coating which is removed is determined, of course, by the width of the cutter edge which, in illustrated embodiment, is of the order of 50 mils.

While the high-speed tool steel is preferably selected for the cutter element 11 to minimize wear, and stainless steel is preferably selected for the front cylindrical support 10 for the same reason, so as to avoid gage error, it may be desirable for the user to check the gage periodically for wear of either of these two parts. This can be done by setting the gage scale on the negative side of the "0" mark, i.e. towards the —1 mil graduation. If, when at this setting, there is a noticeable cut into the coating, it signifies wear on the coating engaging surface portion of support 10. On the other hand, if it is necessary to set the gage scale on the positive side of the "0" mark to obtain a noticeable cut into the coating, it signifies undue wear of the cutting edge. In either event, recalibration of the gage then becomes necessary.

The construction illustrated in the drawings also permits accurate readings on curved surfaces by determining the setting of cam cylinder 12 where a scratch is just observed in the surface of coating 21. If the value is negative, it should be added to, or if positive subtracted from the final reading.

I claim:

1. In a gage for measuring the thickness of a dry coating upon a base material, the combination comprising a frame, a pair of support members mounted in said frame in spaced relation, and a cutter member located intermediate said support members and adapted to penetrate the coating as said gage is slid along the coating on said supports, one of said support members being constituted as a cam the surface of which lies in contact with the coating, and means for rotationally adjusting said cam to thereby effect an adjustment in the depth to which said cutter penetrates the coating.

2. A dry coating thickness gage as defined in claim 1 wherein said upport cam is constituted by a cylindrical member mounted for rotational adjustment about an axis eccentric to its geometrical center.

3. A dry coating thickness gage as defined in claim 1 wherein the other said support member is constituted by a cylinder and said cutter member is secured within a bore provided in said cylinder.

4. A dry coating thickness gage as defined in claim 1 wherein the other said support member is constiuted by a cylinder provided with a peripheral groove, and said cutter member is secured within a bore provided in said cylinder in alignment with said groove and protrudes outwardly therefrom.

5. A dry coating thickness gage as defined in claim 1 wherein said support cam is constituted by a cylindrical member mounted on the shank of a tightening bolt threaded into said frame for rotational adjustment about an axis eccentric to its geometric center, a side face of said cam being provided with a coating thickness scale, and wherein the other said support member is constituted by a cylinder secured within an arcuate bore in said frame and provided with a peripheral groove, said cutter member being secured within a bore provided in said cylinder in alignment with said groove and the cutting edge thereof protruding outwardly therefrom.

6. A dry coating thickness gage as defined in claim 5 wherein said frame includes a side plate and said side plate is provided with an arcuate opening having a beveled face portion overlying the graduations of said thickness scale and being provided with a reference mark for said scale graduations.

References Cited

UNITED STATES PATENTS 2,279,264   4/1942   Hoffman.
2,546,990   4/1951   Euverard.
2,801,540   8/1957   Rondeau.

ROBERT B. HULL, *Primary Examiner.*